(12) United States Patent
Chu

(10) Patent No.: US 10,704,452 B2
(45) Date of Patent: Jul. 7, 2020

(54) COOLING SYSTEM FOR ENGINE

(71) Applicants: Hyundai Motor Company, Seoul (KR); Kia Motors Corp., Seoul (KR)

(72) Inventor: Dong Ho Chu, Yongin-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 21 days.

(21) Appl. No.: 16/118,839

(22) Filed: Aug. 31, 2018

(65) Prior Publication Data

US 2019/0316512 A1 Oct. 17, 2019

(30) Foreign Application Priority Data

Apr. 17, 2018 (KR) .......................... 10-2018-0044678

(51) Int. Cl.
*F01P 3/20* (2006.01)
*F02B 29/04* (2006.01)

(52) U.S. Cl.
CPC ............ *F01P 3/20* (2013.01); *F02B 29/0443* (2013.01); *F01P 2060/02* (2013.01)

(58) Field of Classification Search
CPC .. F01P 2060/02; F01P 3/20; F01P 5/10; F02B 29/0443; F02B 39/00; F16D 2500/1068; F02D 23/005
See application file for complete search history.

(56) References Cited

U.S. PATENT DOCUMENTS

| 4,608,827 | A | * | 9/1986 | Hasegawa | F01P 3/12 123/41.31 |
| 4,829,939 | A | * | 5/1989 | Veenemans | F01P 3/20 123/41.29 |
| 5,415,147 | A | * | 5/1995 | Nagle | F01P 3/20 123/41.29 |
| 6,622,668 | B2 | * | 9/2003 | Izumi | E02F 9/00 123/41.49 |
| 7,469,689 | B1 | * | 12/2008 | Jones | F02B 33/40 123/41.31 |
| 9,670,831 | B2 | * | 6/2017 | Hotta | B60W 10/08 |
| 9,957,877 | B2 | * | 5/2018 | Morishima | F01P 7/164 |
| 9,987,903 | B2 | * | 6/2018 | Burke | B60H 1/00271 |
| 2018/0179946 | A1 | * | 6/2018 | Kakuta | F02B 29/0443 |

FOREIGN PATENT DOCUMENTS

JP 2014-015885 A 1/2014
KR 10-2015-0041542 A 4/2015

* cited by examiner

*Primary Examiner* — Jesse S Bogue
(74) *Attorney, Agent, or Firm* — Morgan, Lewis & Bockius LLP

(57) ABSTRACT

A cooling system for an engine, may include a low temperature radiator; an intercooler installed to receive a coolant cooled from the low temperature radiator and restore the coolant to the low temperature radiator again after heat exchange; a water pump installed to supply the coolant to the intercooler by pumping the coolant cooled from the low temperature radiator; a motorized supercharger installed to receive the coolant from the intercooler; and a reservoir installed to store the coolant passing through the motorized supercharger and deliver the coolant to a coolant line between the low temperature radiator and the water pump.

7 Claims, 2 Drawing Sheets

COOLING SYSTEM FOR ENGINE

CROSS REFERENCE TO RELATED APPLICATION

The present application claims priority to Korean Patent Application No. 10-2018-0044678, filed Apr. 17, 2018, the entire contents of which is incorporated herein for all purposes by this reference.

BACKGROUND OF THE INVENTION

Field of the Invention

The present invention generally relates to a cooling system for an engine and, more particularly, to a technique relating to a device for cooling an intercooler and a supercharger used for an internal combustion engine.

Description of Related Art

Since an engine produces power by combusting fuel with inhaled air, the engine is provided with a supercharging device to inhale as much air as possible for increasing specific power, and with an intercooler to increase density by lowering the temperature of supercharged air.

A motorized supercharger driven by a motor may be used for the supercharging device, and the intercooler may be constructed to perform cooling by water for increasing the cooling efficiency of inhalation.

Proper cooling is necessary for securing sufficient operation time and stable operability of the motorized supercharger.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a cooling system for an engine, which aims for the minimization of power consumption and the proper cooling of an intercooler and a motorized supercharger by efficiently cooling the motorized supercharger and the intercooler cooling air compressed by the supercharger.

Various aspects of the present invention are directed to providing a cooling system for an engine, the cooling system including: a low temperature radiator; an intercooler installed to receive a coolant cooled from the low temperature radiator and restore the coolant to the low temperature radiator again after heat exchange; a water pump installed to supply the coolant to the intercooler by pumping the coolant cooled from the low temperature radiator; a motorized supercharger installed to receive the coolant from the intercooler; and a reservoir installed to store the coolant passing through the motorized supercharger and deliver the coolant to a coolant line between the low temperature radiator and the water pump.

The motorized supercharger may be installed to receive the coolant through only the intercooler, and the coolant passing through the motorized supercharger may be delivered to the low temperature radiator through only the reservoir.

The motorized supercharger and the reservoir may be installed above the intercooler.

The coolant passage connected to the motorized supercharger from the intercooler may be constructed as a single passage connecting the intercooler and the motorized supercharger without a branch point for sending a portion of the coolant to other places or a merge point for receiving the coolant from outside.

The coolant passage connected to the reservoir from the motorized supercharger may be constructed as a single passage connecting the motorized supercharger and the reservoir without a branch point for sending a portion of the coolant to other places or a merge point for receiving the coolant from outside.

The passage for restoring the coolant to the low temperature radiator from the intercooler may be installed to form a single closed line with a passage for restoring the coolant to the low temperature radiator through the motorized supercharger and the reservoir from the intercooler.

The present invention aims for the minimization of power consumption required for cooling and the proper cooling of the intercooler and the motorized supercharger, thereby sufficiently reducing the temperature of air inhaled into the engine, sequentially realizing the operation of the motorized supercharger, and securing the stable operability and durability of the motorized supercharger.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
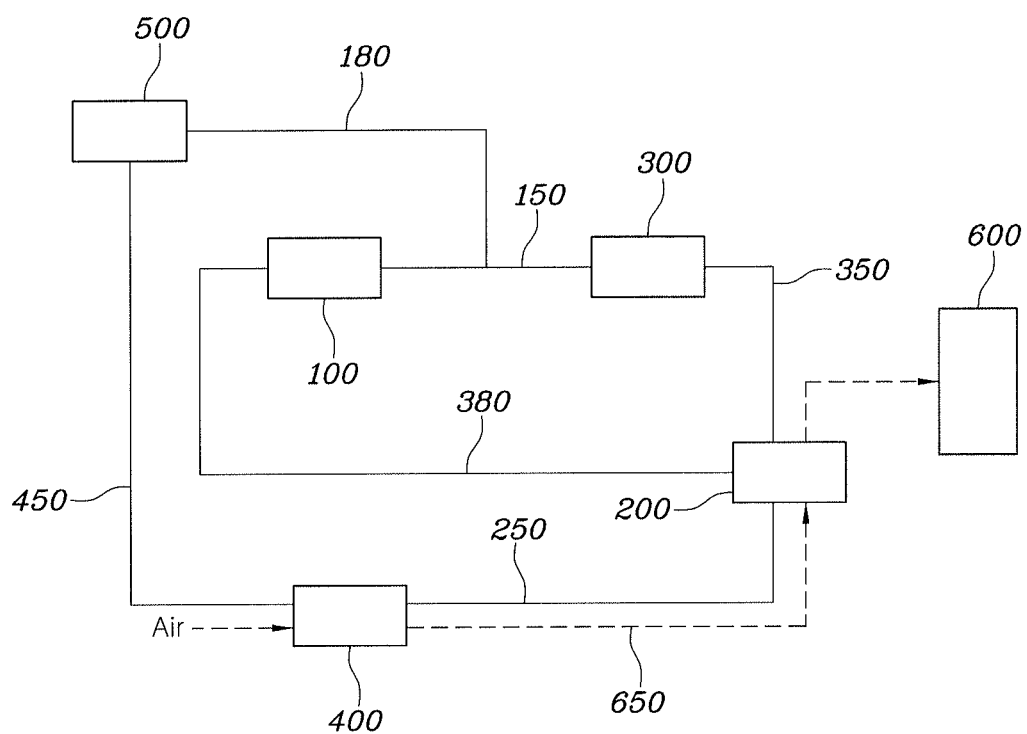
FIG. 1 is a view illustrating the construction of a cooling system for an engine according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Figure 2:
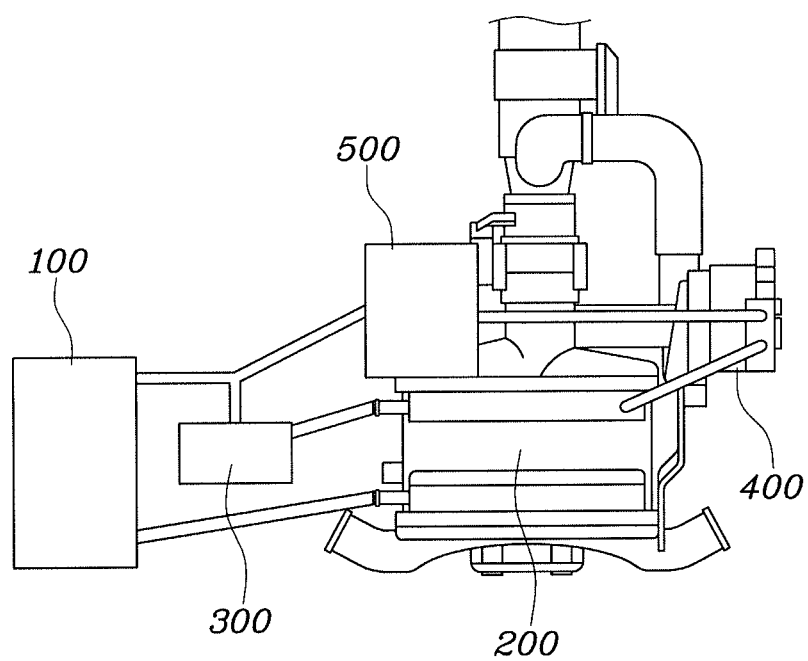
FIG. 2 is a view illustrating the cooling system for an engine along with specific examples of an intercooler and a motorized supercharger.

Referring to FIG. 1 and FIG. 2, a cooling system for an engine of the present invention, includes: a low temperature radiator 100; an intercooler 200 installed to receive a coolant cooled from the low temperature radiator 100 and restoring the coolant to the low temperature radiator 100 again after heat exchange; a water pump 300 installed to supply the coolant to the intercooler 200 by pumping the coolant cooled from the low temperature radiator 100; a motorized supercharger 400 installed to receive the coolant from the intercooler 200; and a reservoir 500 installed to store the coolant passing through the motorized supercharger and deliver the coolant to a coolant line 150 between the low temperature radiator 100 and the water pump 300, wherein the coolant line 150 is connected to a passage 180 connected to the reservoir 500.

For reference, air compressed in the motorized supercharger 400 and cooled in the intercooler 200 is supplied to an engine block 600 including a combustion chamber, through an air passage 650 connecting the motorized supercharger 400, the intercooler 200, and the engine block 600, and a main radiator for cooling the engine block 600 is separated from the low temperature radiator 100 to construct a separate cooling circuit.

The low temperature radiator 100 reduces the coolant temperature to be lower than the temperature of the main radiator, and provides the coolant for the intercooler 200 and the motorized supercharger 400.

The motorized supercharger 400 and the reservoir 500 are installed above the intercooler 200, and the reservoir 500 communicates with the atmosphere to release air included in the coolant into the atmosphere.

The motorized supercharger 400 is installed to receive the coolant through only the intercooler 200, and the coolant passing through the motorized supercharger 400 is delivered to the low temperature radiator 100 through only the reservoir 500.

In other words, a coolant passage connected to the motorized supercharger 400 from the intercooler 200 is constructed as a single passage 250 connecting the intercooler 200 and the motorized supercharger 400 without a branch point for sending a portion of the coolant to other places or a merge point for receiving the coolant from outside, and a coolant passage 450 connected to the reservoir 500 from the motorized supercharger 400 is also constructed as a single passage connecting the motorized supercharger 400 and the reservoir 500 without a branch point for sending a portion of the coolant to other places or a merge point for receiving the coolant from outside.

Therefore, a passage for restoring the coolant to the low temperature radiator 100 from the intercooler 200 forms a single closed line with a passage for restoring the coolant to the low temperature radiator 100 through the motorized supercharger 400 and the reservoir 500 from the intercooler 200.

Meanwhile, the water pump 300 may be constructed as a motorized water pump, which is used in an exemplary embodiment of the present invention.

According to the cooling system constructed as mentioned above, when the water pump 300 supplies the coolant of the low temperature radiator 100 to the intercooler 200 by pumping the coolant thereof through a passage 350 connecting the water pump 300 and the intercooler 200, the passed air exchanges heat with the coolant for cooling in the intercooler 200.

The coolant cooling air in the intercooler 200 is generally cooled by being restored to the low temperature radiator 100 through a passage 380 connecting the low temperature radiator 100 and the intercooler 200, and a portion of the coolant of the intercooler 200 is supplied to the motorized supercharger 400.

The coolant supplied to the motorized supercharger 400 flows to the reservoir 500 after cooling the motorized supercharger 400, and air included in the coolant is released into the atmosphere.

In other words, the coolant supplied to the intercooler 200 from the low temperature radiator 100 cools the intercooler 200, and a portion thereof is moved to the reservoir 500 after cooling the motorized supercharger 400. Accordingly, air generated during the flow of the intercooler 200 or the motorized supercharger 400 is released through the reservoir 500 and is restored to the coolant line 150 between the low temperature radiator 100 and the water pump 300 again, and the other coolant is instantly restored to the low temperature radiator 100 from the intercooler 200.

Therefore, a portion of the intercooler 400 where the coolant is supplied to the motorized supercharger 400 is preferably located on an upper side of the intercooler 200, thereby easily moving air included in the coolant to the reservoir 500 through the motorized supercharger 400.

With regard to the cooling system constructed and operated as above, the motorized supercharger 400 is not located on the coolant line extending from the low temperature radiator 100 and the water pump 300 through the intercooler 200 and returning to the low temperature radiator 100. Accordingly, the water pump 300 is operated at the level of only forming coolant flow pressure required for the intercooler 200. Furthermore, with regard to the cooling of the motorized supercharger 400, the constant cooling of the motorized supercharger 400 is promoted using a coolant flow rate which should naturally pass through the reservoir 500 for discharging air generated from the coolant cooling the intercooler 200, thereby minimizing the consumption of energy required for cooling the intercooler 200 and the motorized supercharger 400, and sufficiently securing the cooling performance of the intercooler 200 and the motorized supercharger 400.

In other words, with regard to the construction as above, the motorized supercharger 400 is not disposed in series on the coolant line formed by the low temperature radiator 100, the water pump 300, and the intercooler 200. Accordingly, the flow resistance to the coolant circulated in the coolant line to cool the intercooler 200 is relatively low, thereby reducing the output of the water pump 300.

Furthermore, in the construction of the present invention, not only air generated from the intercooler 200 but also air of bubbles generated during the cooling process of the motorized supercharger 400 are released into the atmosphere simultaneously through the reservoir 500, thereby consistently and stably securing the cooling performance of the intercooler 200 and the motorized supercharger 400.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cooling system for an engine, the cooling system comprising:
    a radiator;
    an intercooler connected to the radiator to receive a coolant cooled from the radiator and restore the coolant to the radiator again after heat exchange;
    a water pump connected to the intercooler to supply the coolant to the intercooler by pumping the coolant cooled from the radiator;
    a supercharger connected to the intercooler to receive a first portion of the coolant from the intercooler; and
    a reservoir connected to the supercharger to store the first portion of the coolant passing through the supercharger and deliver the first portion of the coolant to a coolant line connecting the radiator and the water pump,
    wherein the supercharger is installed to receive the first portion of the coolant only through the intercooler,
    wherein the first portion of the coolant passing through the supercharger is delivered to the radiator through the reservoir,
    wherein a first coolant passage connected between the supercharger and the intercooler is constructed as a first single passage connecting the intercooler and the supercharger, without a branch point for sending a portion of the coolant to other places or a merge point for receiving the coolant from outside, and
    wherein a second coolant passage connected between the reservoir and the supercharger is constructed as a second single passage connecting the supercharger and the reservoir, without a branch point for sending a portion of the coolant to other places or a merge point for receiving the coolant from outside.

2. The cooling system of claim 1, wherein the supercharger and the reservoir are installed above the intercooler.

3. The cooling system of claim 1, wherein the radiator, the water pump and the intercooler are connected to form a single closed line including the coolant line.

4. The cooling system of claim 3, wherein a second portion of the coolant passing the intercooler is supplied to the radiator along the single closed line.

5. The cooling system of claim 1, wherein a passage for restoring the coolant to the radiator from the intercooler is mounted to form a circulation loop with the first and second coolant passages for restoring the coolant to the radiator through the supercharger and the reservoir from the intercooler.

6. The cooling system of claim 1, wherein an air passage is mounted to connect the supercharger, the intercooler, and an engine block.

7. The cooling system of claim 6, wherein air compressed in the supercharger and cooled in the intercooler is supplied to the engine block through the air passage.

* * * * *